Patented May 20, 1952

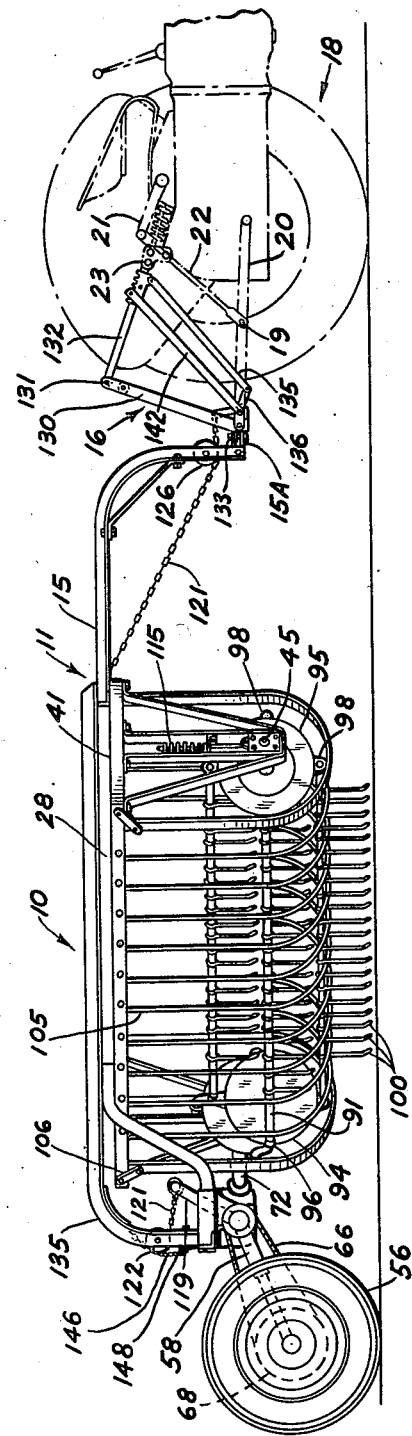

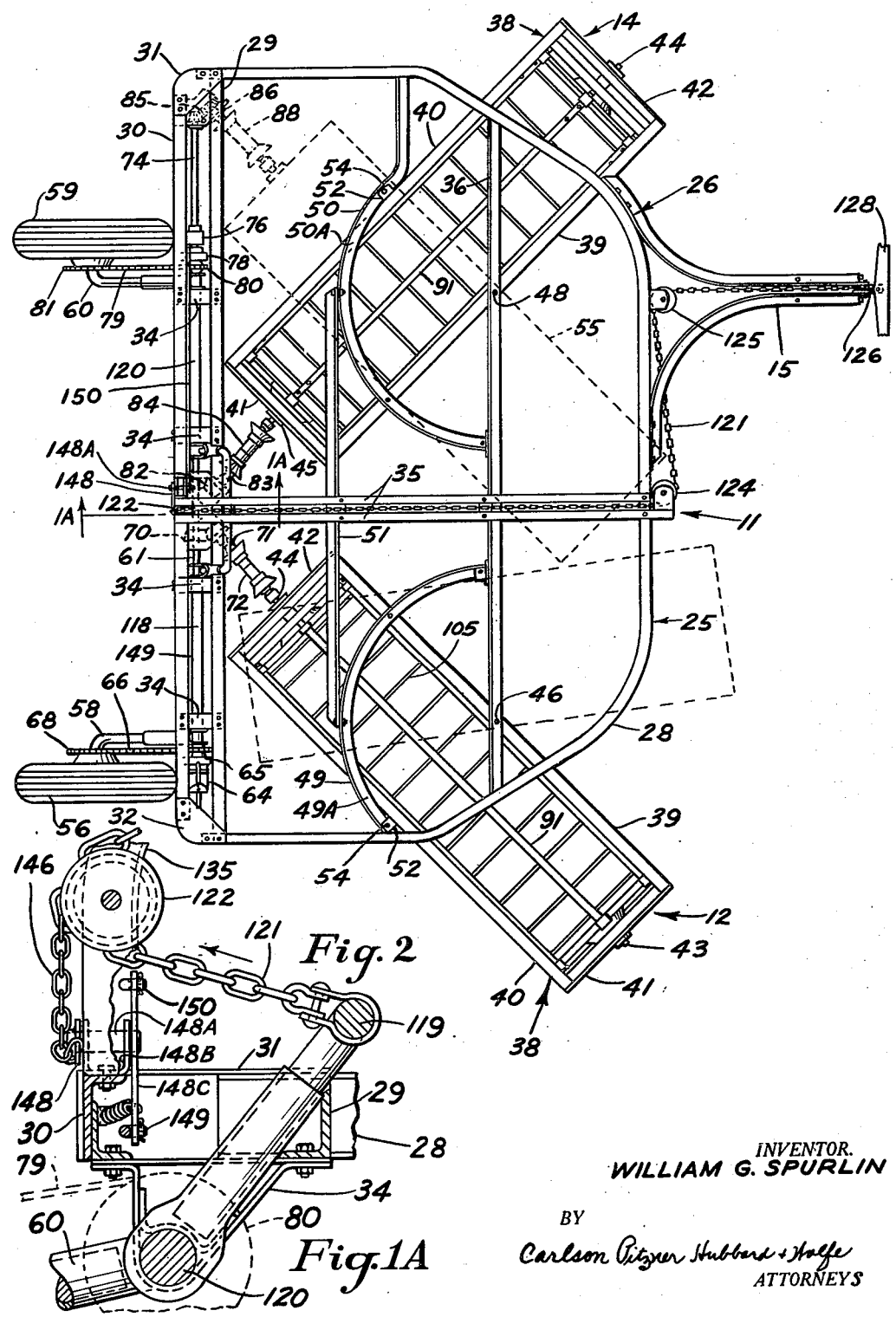

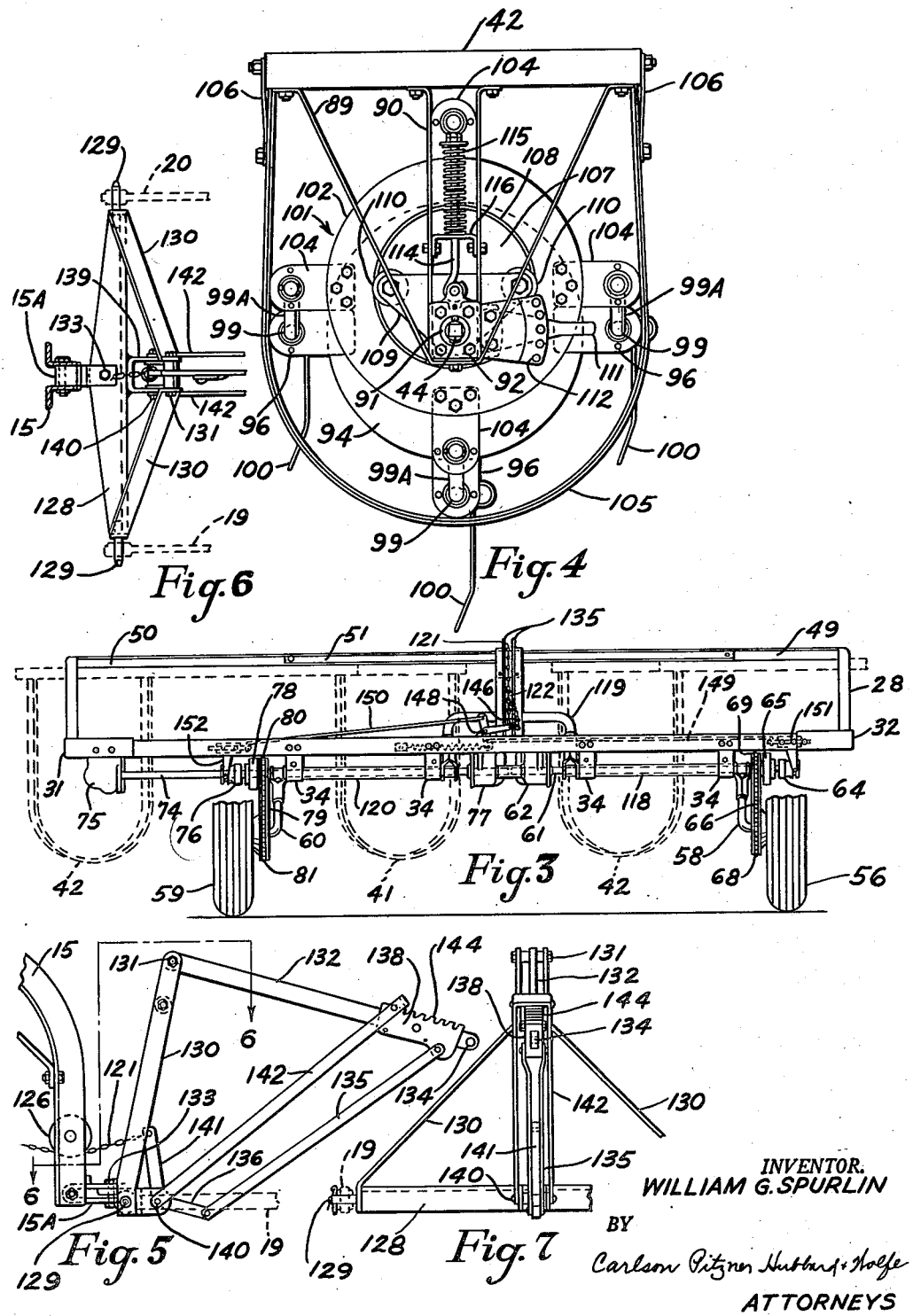

2,597,828

UNITED STATES PATENT OFFICE 2,597,828

TWIN REEL SIDE DELIVERY RAKE

William G. Spurlin, Dearborn, Mich., assignor to Harry Ferguson, Inc., Dearborn, Mich., a corporation of Delaware Application February 5, 1947, Serial No. 726,475

10 Claims. (Cl. 56—377)

The present invention relates to tractor drawn rakes and more particularly to an improved form of twin reel side delivery rake.

A primary object of the present invention is to provide an implement structure for utilizing the above mentioned arrangement of reels but including additional novel features of construction so that the advantages inherent in the basic reel setup may be realized to an even greater extent.

It is also an object to provide an improved rake structure enabling more effective use of the tractor power-elevated hitch mechanism and thereby reducing the manual effort required in the operation of such a rake to a minimum. It is a related but more detailed object to provide an implement hitch including improved auxiliary linkage, operated as an incident to raising the tractor draft links, for shifting elements on the implement which are effective to condition the same for use or for transport.

It is another object to provide a side delivery rake having a raking reel which may be bodily positioned in accordance with the desired direction of discharge and which includes improved means for driving the reel in a plurality of predetermined raking positions.

It is a further object to provide a twin side delivery rake in which the raking wheels may be coordinated with the swaths left by a conventional mower and which, in addition, enables the tractor to be so positioned laterally with respect to the raking reels that the necessity for the tractor to run over cut and cured hay may be reduced to a minimum.

It is still another object to provide a side delivery rake having laterally spaced reels arranged to discharge into separate windrows or convergently into a single windrow in which the reels are so mounted as to be spaced apart by an amount which is coordinated with the size of the windrow produced under the alternative discharge conditions. It is a related object to provide an improved reel mounting enabling the reels to be fixed firmly in an adjusted position but which at the same time guidingly supports the reels in their paths of adjustment to reduce the manual effort required for the adjustment to a minimum.

It is a still further object of the invention to provide a power driven reel including means for driving the reel from either of its ends. It is yet another object to provide a tractor-drawn implement having a plurality of positionable control elements and improved means for positioning such elements in a predetermined sequence upon actuation of a power operated control device on the tractor.

Other objects and advantages of the invention will be apparent from the following detailed description taken in connection with the accompanying drawings in which:

Figure 1 is a view in elevation of a tractor drawn side delivery rake constructed in accordance with the invention showing the special hitch for connecting such rake to the tractor.

Fig. 1A is an enlarged fragmentary section of the rear end portion of the rake taken along line IA—IA of Fig. 2.

Fig. 2 is a plan view of the side delivery rake shown in Fig. 1, the individual reels thereon shown adjusted to discharge convergently into a common windrow.

Fig. 3 is a rear elevational view of the rake shown in Figs. 1 and 2 looking in the direction of the tractor.

Fig. 4 is an end elevational view of one of the reels shown in the preceding figures and disclosing the improved means for varying the angle of the raking teeth.

Fig. 5 is a detailed view of the implement hitch including auxiliary linkage for causing shifting of a control element on the implement as an incident to elevating the tractor links.

Fig. 6 is a fragmentary plan view of the drawbar portion of the implement hitch taken along the line 6—6 of Fig. 5.

Fig. 7 is a view in elevation of the hitch disclosed in Fig. 6 and looking in the direction of the implement.

While the invention is susceptible of various modifications and alternative constructions and uses, I have shown in the drawings and will herein describe in detail one embodiment of the invention. It is to be understood, however, that I do not intend to limit the invention by such disclosure, but aim to cover all modifications and alternative constructions and uses falling within the spirit and scope of the invention as expressed in the appended claims.

The rake disclosed in the copending Riley and Harrison application, to which reference has already been made, embodies a novel approach to the problem of raking which overcomes practically all of the disadvantages of conventional rakes; the teachings of that application are, therefore, employed herein. In accordance with the present invention the basic structure is further improved and additional novel features are included which have been found to be of great practical importance where maximum raking efficiency and the expenditure of a minimum of manual effort are operating requirements.

*General arrangement*

Turning now to the drawings and in particular to Figs. 1 and 2, it will be seen that the exemplary rake indicated generally at 10 includes a main frame 11 and right and left-hand reels which are carried thereby and designated as 12 and 14 respectively. Such reels are normally oriented at an angle of approximately 45 degrees to the direction of movement in either parallel relation or in the converging relation illustrated and, upon being rotatively driven by a convenient source of power, are effective to sweep clear a strip of severed hay depositing such hay in a windrow adjacent the trailing ends of the reels.

In the present instance the main frame 11 has a forwardly extending tongue 15 which is connected at its forward end 15a to an improved hitch 16 shown mounted on the rear end of a tractor 18. The tractor, which has been shown merely in outline form, will be recognized as the well known Ford tractor with the Ferguson System including a power lift mechanism which may be of the type disclosed in Henry George Ferguson patent No. 2,118,180, issued May 24, 1938. Since the latter mechanism does not, of itself, form part of this invention, it will suffice to say that the hitch includes a pair of draft links 19, 20 which may be elevated by cranks 21 and drop links 22. Above the point of connection of the draft links and centered with respect to the latter is a pivotal upper link connection 23 which is utilized as part of the hitch structure later to be described in detail.

Referring now to the plan view of Fig. 2, it will be seen that the main frame 11 includes a laterally extending right-hand portion 25 and a left-hand portion 26 which carry the reels 12, 14 respectively in a laterally spaced relation. In the present instance, the frame 11 is formed primarily of a horizontally arranged, generally U-shaped member 28 which is closed at the rear end by a pair of spaced transversely extending angle members 29, 30. The latter are connected to the ends of the U-shaped member 28 by corner plates 31, 32 and are joined at intervals along their length by members 34 which act as reinforcing spacers. The frame 11 also includes longitudinal members 35 which extend in closely spaced parallel relation along the center line of the frame. A forward transverse member 36 serves both to laterally reinforce the frame and as a pivotal mounting support for the raking reels 12, 14.

Prior to a discussion of the manner in which the reels 12, 14 are mounted within the frame, it will be helpful to point out that each of such reels includes a rectangular reel frame 38 having relatively long side members 39, 40 and end members 41, 42. The raking portion of each reel is suspended from the end members 41, 42 by structure to be described and such raking portions, in the practice of the invention, may receive power alternatively through power connections 44, 45 which are preferably centered along the longitudinal turning axis of the reel.

In accordance with one aspect of the invention means are provided for pivoting at least one of the reels 12, 14 about a vertical axis for adjustment into alternative inward and outward discharge positions and to provide means for guiding and supporting the reels in their paths of adjustment. In the present instance such pivoting takes place about pivots 46, 48 respectively located along the right-hand and left-hand portions of the transversely extending front member 36. The pivots 46, 48 which may, for example, be through-bolts, are received in the central portion of the side members 39 of the reels.

In order to support the opposite side members 40, arcuate supporting members 49, 50 are provided which are horizontally arranged above the respective reel frames, being connected at their innermost ends to the transverse member 36 and at their outermost ends to the rearwardly extending side portions of the U-shaped member 28. The arcuate portions of the members 49, 50 are further supported by a second transversely extending member 51, the center of which is supported, for example, by welding, to the longitudinal members 35.

Conveniently, the arcuate supporting members 49, 50 may be formed from angle stock to present flat guiding surfaces 49A, 50A for the support of a tab-like extension 52 fastened to the portion of the side members 40 and opposite the pivots 46, 48 already referred to. It is apparent that as the reels 12, 14 are moved in their paths of adjustment, they are at all times supported by the tab extensions 52 and thus the shifting of the reels may be readily accomplished with a minimum of manual effort. After adjustment, the reels may be retained in predetermined positions by means of fastening bolts 54 passing through both the tabs 52 and the supporting surfaces of the respective arcuate members.

The first position of adjustment, illustrated in Fig. 2, causes the hay in the path of movement of the implement to be converged inwardly so that all of the hay thus raked is discharged into a common central windrow.

As more fully described in the prior application referred to, one reel of the pair, in this case reel 14, may be rotated into an alternative position 55 (shown dotted in Fig. 2) substantially at right angles to the position illustrated. Under such conditions the reel 14 will discharge into a separate windrow along the left-hand edge of the frame. Such adjustment enables the rake to be used for two distinct types of raking in which the hay may be discharged into a common windrow or into two separate windrows depending upon crop and weather conditions.

With the reels discharging convergently into a single windrow (as illustrated), a fairly sizable windrow may be formed. To make it unnecessary to rake the strip on which the windrow is deposited, it will be noted that the inner, mutually adjacent portions of the reels may be spaced laterally a sufficient distance to provide ample clearance for the hay delivered from both reels. Since it is contemplated that the reels will usually be so adjusted for raking relatively light yields the space need not be very wide. However, where the reels are positioned to discharge into separate windrows, the reel 14 being swung to the position 55, the mutually adjacent ends of the reels are spaced laterally from one another only a small amount or may even overlap slightly as illustrated. In short, the mounting of the reels is such as to produce a relatively wide gap between them when they discharge convergently and a narrower gap when they are arranged to discharge into separate windrows. The width of the gap is therefore sufficiently large in either case to allow free passage of the hay.

As taught in the copending Riley and Harrison application, each of the reels is preferably of such length as to enable the reels to individually and completely accommodate adjacent swaths left by a conventional mower. In order to accomplish such coordination between raking and mowing, it is merely necessary for the farmer to guide the implement so that the cleared strip between adjacent swaths (formed by the swathboard on the mower) is centered between the reels. Thus there is no need for the raking reels to sweep over the cleared strip which, in effect, increases the raking capacity of the implement without increasing its size. Such coordination also makes it possible to reduce to a minimum running over of the cut and partially cured hay by the tractor. Even when the rake is not centered between adjacent swaths as outlined, the raking may be performed with improved efficiency as compared to the prior art since the raked hay is deposited on the unraked strip between the reels.

As disclosed in Fig. 2, the implement tongue 15, which is alined with the center line of the tractor 18, is attached to the frame 28 in an offset relation. In the present instance it will be noted that such tongue is substantially in line with the center portion of reel 14. Since the reel 14 is, at each pass, alined with a mower swath, the tractor, too, will be alined with such swath. With the wheels on the tractor adjusted to straddle the swath, crushing of the hay caused by the tractor may be substantially eliminated.

If desired, the reels may both be rotated about their respective pivots so that their axes are approximately alined with the direction of movement of the tractor. When locked in such position, for example by the bolts 54, the rake assembly is in a compact condition suitable for transport. It is then possible for the rake to be passed through a gate which is considerably smaller than the width of the strip which may be accommodated by the rake during use.

Reel drive

In accordance with one aspect of the invention, a reel drive is provided which enables a given reel to be driven, and in the proper direction, under both of the above-mentioned discharge conditions in a simple and effective manner. In the present embodiment the right-hand reel 12 is driven by a ground wheel 56 which is rotatably mounted at the end of a rearwardly and downwardly extending arm 58 while the left-hand reel 14 is driven from a ground engaging wheel 59 mounted on a similar arm 60. Both of the arms 58 and 60 are normally substantially rigid with the main frame and thus assist in sustaining the weight of the latter although the arms may be rotated downwardly about their point of fastening to cause bodily raising of the frame as subsequently described.

Referring in more detail to Figs. 2 and 3, it will be noted that a reel drive shaft 61 extends along the right-hand rear edge of the main frame being rotatably supported by the bracket-like members 34 and, at its innermost end, by a gearbox 62. At its outer end, on the other hand, the shaft 61 is connected to a clutch having an outwardly extending element 64 and a cooperating inner element 65. In the present embodiment the inner clutch element 65 is rotatively coupled to the ground engaging wheel 56 by a sprocket chain 66 which is trained over appropriate sprockets 68, 69.

To drive the reel 12 from the shaft 61, a geared connection is used consisting of a pair of bevel gears 70 (Fig. 2), a connected stub shaft 71 extending at an angle to the direction of the movement of the vehicle, and a disengageable coupler 72 at the end of the stub shaft 71. The latter is so oriented with respect to the reel 12 that the power connection 44 at the end of the reel may be swung into alinement with it and the coupler 72 then readily attached. Such coupler may be flexible in nature to take up a limited amount of misalinement and to enable a minimum of shock and vibration to be transmitted to the reel. Using the arrangement shown and with the clutch 64, 65 normally engaged, it will be apparent that rotation of the wheel 56, acting through the shaft 61 and the coupling 72, will cause the reel 12 to rotate in a direction to sweep the hay convergently inward.

In the case of left-hand reel 14 power is transferred from the ground wheel 59 thence through shaft 74 which lies along the left-hand rear edge of the frame, being rotatably supported in such position by the members 34, by outer gearbox 75, and by inner gearbox 77. Secured to the shaft 74 to rotate therewith is an outer clutch element 76 which cooperates with an inner clutch element 78 rotating in unison with the ground wheel 59. As in the case of the previously described driving connection, the ground wheel and clutch are coupled through a sprocket chain 79 trained over sprocket wheels 80, 81. With the reel 14 swung to the position shown in Fig. 2, shaft 74 is caused to drive the same through a pair of bevel gears 82 (in gearbox 77), an angularly extending stub shaft 83, and detachable coupling 84, the latter being alined with the power connection 45 on the reel.

With the reel 14 in its alternative right angled position indicated at 55, the driving function is performed by a pair of gear wheels 85 (in gearbox 75), a stub-shaft 86, and a coupling 88 which extends at substantially right angles to the coupling 84.

It may be incidentally noted that the independent drive for the respective reels enables the ground wheels 56, 59 to rotate independently of one another. This is particularly advantageous when it is desired to make a sharp turn at the end of the field since one of the wheels can, if desired, be brought to a standstill or even reverse its direction during such turning.

In accordance with a more detailed aspect of my invention, means are provided for causing the reel 14 to rotate in the same direction and with the same edge presented forwardly regardless of whether the reel is oriented to discharge to the right or to the left. This is accomplished by providing the reel 14 with the two driving connections 44 and 45 at the respective ends of the reel. Thus the connection 45 is used with the reel oriented for convergent discharge while the connection 44 is used, in conjunction with the coupling 88, when the reel is turned to discharge outwardly. Regardless of which driving connection is used the raking elements thereon (to be described) will be caused to sweep forwardly but at an angle with respect to the direction of travel.

As an additional feature, the reel driving mechanisms may include a so-called overrunning drive or one-way coupling. Such a coupling may take any desired form and may, for example, consist of a one-way ratchet housed within the inner clutch elements 65 and 73. This enables the rotating portion of the reels to coast or run freely when the associated ground wheel is slowed momentarily for any reason and enables the rotative speed of the reels to be more constantly maintained.

Reel structure

Although raking reels are known in the prior art in which the teeth are maintained in a downward direction as they sweep along the ground, nevertheless my improved reel structure as disclosed in Fig. 1 and in greater detail in Fig. 4 includes structural features making it particularly well suited for use with a rake having the general arrangement disclosed herein. Turning now to Figs. 1 and 4 it will be seen that the end members 41, 42 of the reels have fastened thereto a downwardly extending bracket consisting of strap members 89, 90 which form a rigid sling suspension for the rotating portion of the reel.

Arranged longitudinally below the reel frame 38 is a reel shaft 91 which is journaled at its ends in bearings 92 mounted in the bracket 89, 90. Drivingly connected to the shaft 91 near the ends thereof are members 94, 95 bearing sets of outwardly extending legs 96, 98, respectively. The latter legs are paired and carry tooth-supporting bars 99 rotatably mounted therein which extend parallel to the reel axis. For purposes of convenience the members 94, 95 may be called spider members although it will be apparent that they may take any desired form which enables bars 99 to be radially supported thereon.

Mounted in spaced relation along bars 99 and rigid therewith are hay-engaging spring teeth 100 which, as shown in Figs. 1 and 4, point downwardly toward the ground. The teeth 100 are maintained in this direction at all times by a crank mechanism designated generally as 101 at one end of each of the reels. In the present instance the crank mechanism includes an auxiliary or second spider member 102 which is rotatable about an axis which is offset a short distance upwardly from the spider member 94. Such auxiliary member 102 includes radially extending legs 104 corresponding to each of the legs 96 on the adjacent spider member 94. To operatively associate the spider members 94, 102, each of the tooth-carrying bars 99 has a short bent-over portion or crank 99A, the end of which is rotatably received within a hole at the end of the adjacent leg 104 of the offset spider member 102.

As the spider member 94 rotates causing the bars 99 to be bodily translated in a circular path, it will be apparent that the offset spider member 102 will rotate in unison therewith. It will be noted, however, that in all angular positions of rotation the outer ends of the arms 104 will be at a predetermined distance above the outer ends of the corresponding arms 96. Thus the crank portions 99A of the tooth-carrying bars 99 will be constrained in an upwardly extending direction with the teeth 100 pointed toward the ground. As the reel shaft 91 is rotated, the teeth 100 will undergo an orbital translatory or sweeping movement which is highly desirable for raking purposes. In order to prevent any hay from clinging to the teeth 100 as they are drawn upwardly at the end of the raking stroke, U-shaped strippers 105 are interspersed between the teeth, being fastened at their upwardly projecting ends to the side members 39, 40 of the reel frame, for example by means of retaining straps 106 (see Fig. 4).

Assuming that the offset between the spider members 94, 102 is maintained in a predetermined direction, for example, upwardly as shown in Fig. 4, the spring teeth 100 will at all times project straight down as illustrated. In accordance with one aspect of the invention, however, improved means are provided for causing the offset spider member 102 to be additionally offset with respect to the spider member 94 and in a direction which is preferably perpendicular to the original offset. In this way the direction of the teeth 100 may be changed so that they make an angle which may be either greater or less than 90 degrees with respect to the ground. In understanding how the latter is accomplished it will be necessary to inspect Fig. 4 in somewhat greater detail, particularly as regards the means for rotatably mounting the offset spider member 102.

Here it will be seen that the offset spider member 102 includes a large circular aperture 107 having an inwardly directed bearing edge 108. Lying within the circular aperture and restrained against rotation is a bearing plate 109. Such plate may be of any desired shape although here it is shown as triangular carrying rotatable rollers 110 for engaging the inwardly directed bearing edge 108.

The bearing plate 109 is mounted on the shaft 91 so that it may be rocked about such shaft through a limited angle on each side of the position illustrated in Fig. 4. In the present instance, such rocking is effected by a rockable tooth-adjusting arm 111 which is rigid with respect to the bearing plate 109. As illustrated, the arm 111 may be locked in an adjusted position by means of a dowel extending through one of the holes in an adjacent locking plate 112, the latter being fixed to the bearing 92 and thus prevented from rotating.

In operation, if it is desired to cause the teeth 100 to be oriented at an angle forwardly of the position shown, in other words clockwise, it is merely necessary to advance the tooth-adjusting arm 111 in a clockwise direction. This has the effect of rotating the bearing plate 109 through a small angle clockwise about shaft 91 as a center. It will be apparent, then, that the rollers 110 will be translated to the right and will carry with them the inner bearing edge 108 of the offset spider member 102. This causes the member 102 to be translated to the right (as shown in Fig. 4) and the crank 99A, and therefore the teeth 100, to be rotated in a clockwise direction. It will likewise be apparent that the teeth 100 may be rotated counterclockwise or "retarded" merely by rotating the tooth-adjusting arm 111 a small amount in the counterclockwise direction.

It has been stated above that in the practice of the invention the reversible reel 14 may be driven alternatively by power connections 44, 45 located at opposite ends of the reel. It will be apparent, then, that an important advantage of the reel structure discussed in detail above is the fact that the driving connection 44 from the inner spider member 94 is brought out eccentrically through an aperture in the offset spider member 102 lying adjacent to it.

Still another structural feature which makes the disclosed reel ideally suited to the present purpose is the fact that each of the bearings 92 and therefore the associated rotating elements is spring-suspended to enable the teeth 100 and all of their associated driving elements to be displaced upwardly in the event that the teeth 100 strike an obstruction as they are drawn over the ground. This is accomplished in the present instance by suspending the bearing 92 from a rod 114 which in turn is supported by a compression spring 115 which bears against a bridge-like support 116 on the bracket strap 90.

*Elevation for transport*

In order to prevent the reels and in particular the spring teeth 100 from being damaged as the rake is transported, it is desirable to raise the entire frame 11 with respect to the ground under such conditions. As taught in the above-mentioned copending application, this may be accomplished to a large extent by raising the forward end of the frame by means of the power elevating mechanism on the tractor, pivoting the frame about the rear ground-engaging wheel as a fulcrum. In the practice of the present invention means are provided for elevating the rear end of the implement frame as an incident to the elevation of the tractor hitch links. In the present embodiment this is accomplished by mounting the ground-engaging wheels at the rear of the implement in a manner which enables the frame height to be varied and, in addition, by providing auxiliary linkage in the hitch between the tractor and implement which undergoes movement upon the raising of the tractor draft links, which movement is transmitted to the adjustably mounted ground wheels.

Prior to a discussion of the auxiliary hitch linkage, it will be helpful to inspect in some detail the manner in which the ground wheels 56, 59 are mounted. Referring first to the ground wheel 56 (Figs. 1 and 3), it is observed that the arm 58 which supports it is connected in a torque-transmitting engagement to a torque tube 118 which is telescoped over the shaft 61 throughout the greater portion of the length of such shaft. At the inner end of the torque tube 118 and also fastened thereto in a torque-transmitting engagement, for example by welding, is a U-shaped yoke 119 extending radially away from the tube and serving, therefore, as the second arm of a bell crank of which the wheel engaging member 58 serves as the remaining arm.

Likewise in the case of ground wheel 59, its supporting arm 60 assumes an angle determined by the angular positioning of a torque tube 120 telescoped over the drive shaft 74 and which terminates at its inner end in a torque-transmitting connection with the U-shaped yoke 119. It is apparent therefore that the angular position of the U-shaped yoke 119 will determine the angle that the wheel engaging arms 58, 60 make with the earth and will, therefore, define the height of the rear end of the implement frame above the ground.

In the present instance the angle assumed by the U-shaped yoke 119 is determined by the positioning of a chain 121 which is connected to the horizontal portion of the yoke 119 and passes forwardly along the upper side of the implement frame being trained over pulleys 122, 124, 125 and 126. The means for positioning the forward end of the control chain 121 may now be observed with particular reference to Figs. 1 and 5.

*Implement controlling hitch*

If the implement controlling hitch 16 is first considered without reference to the means for positioning the control chain 121, it will be seen that it consists primarily of a horizontal drawbar 128 (Figs. 5–7) which carries outwardly directed trunnions 129 for pivotal connection to the lower links 19, 20 on the tractor. Extending upwardly in converging relation from the ends of the drawbar 128 are generally vertical members 130. Connected to the converged upper ends of the members 130 at pivot 131 is a generally horizontal member 132 which extends forwardly toward the tractor. The forward end 134 of the latter is arranged to pivotally engage the tractor at the pivot 23 on the tractor to which the so-called "compression link" of the Ferguson system is normally attached. The drawbar 128 and the vertical members 130, taken together, form a sturdy mounting for tractor draft links 19, 20, the upper link 132 and the draft force being transmitted through a hitch connection 133 at the middle of the drawbar 128. In addition such assembly serves as a mounting for auxiliary linkage to be next discussed.

In one of its aspects the present invention contemplates that the vertical movement of the lower links 19, 20 with respect to the tractor housing be utilized for positioning the chain 121. This is accomplished in the present instance by employing an actuating link 135 which extends rearwardly and downwardly from near the point of fastening 134 of the upper link 132 and into engagement with a bell crank 136 which is mounted for pivoting about an axis adjacent the drawbar 128. In order to keep the number of points of attachment to the tractor itself to a minimum, the upper end of the actuating link 135 instead of being connected to the tractor is connected to a member 138 which is bolted or otherwise fixed to the forward end of the upper link 132. Because of its proximity to the tractor housing, the upper end of the actuating member 135 does not move any appreciable amount as the tractor links are elevated.

As to the mounting of the bell crank 136 at the other end of the actuating member 135, it will be noted in Fig. 3 that a short forwardly-extending bracket 139 is welded or otherwise fastened to the center of the drawbar 128 providing a pivot 140. Upon raising the tractor links 19, 20 to an elevated position, the distance between the outer end of such links and the upper portion of the tractor housing is reduced. As a result the bell crank 136 is caused to rotate in a clockwise direction (as viewed in Figs. 1 and 5) and the upwardly extending arm 141 thereof swings forwardly about the pivot 140. By reason of the attachment of chain 121 to the arm 141, such chain is tensioned and positioned in accordance with the elevation of the tractor links.

In order to determine the lowermost level or position of rest to which the lower links 19, 20 and the associated hitch structure may be returned, an auxiliary supporting member is provided which extends rearwardly and downwardly alongside the actuating member 135. Although a chain could be used, I prefer to use a link 142. The latter is, at its lowermost end, connected pivotally to the bell crank pivot 140 and includes provision at its upper end for adjustable engagement with the upper link 132. As shown, this is accomplished by providing in the upper edge of the member 138 a plurality of notches 144 which may be selectively engaged by the auxiliary supporting member 142. Since the auxiliary member 142 extends substantially diagonally within the linkage parallelogram it acts as a diagonal strut to keep the parallelogram linkage from collapsing as a result of the downward force applied by the implement to the rearmost end thereof and therefore serves as a supporting means to adjustably limit the level to which the drawbar 128 may descend. It will be noted that the upper end of the member 142 extends conveniently close to the driver's seat, thus the level of the rake may be manually set, upon lowering, to conform to the raking conditions encountered.

Referring now to Fig. 1 the manner in which the rake is elevated for transport will be apparent. As the lower links 19, 20 of the tractor are elevated by the power lift mechanism the forward end of the rake frame is correspondingly elevated. Simultaneously, the tensioning of chain 121 due to the forward swinging of the bell crank 136 causes the U-shaped yoke 119 associated with the ground engaging wheels 56, 59 (Fig. 2) to swing in a counterclockwise direction. This causes the wheel engaging arm 58, 60 to become more nearly vertical and thereby to elevate the rear end of the implement in unison with the forward end.

In accordance with one aspect of the invention means are provided for rotatively disengaging the reels from their source of power as an incident to elevating the frame 11 for transport. This is effected in the present by disengaging the clutch elements 64, 65 and 76, 78, respectively, which are associated with the ground engaging wheels, such declutching occurring as incident to the tensioning of the chain 121.

As shown to best advantage in Figs. 1A and 3, the chain 121 has an additional branch or end portion 146 which is connected to a declutching finger 148 on a rock shaft 148a which is supported by a U-shaped bracket 148b on the frame and has a cross-arm 148c pivotally engaged through its opposite ends with the inner ends of declutching push rods 149, 150. The outer end of the push rod 149 is connected to a slidably mounted declutching member 151 which rides in an appropriate groove on clutch element 64 so that the outward movement thereof tends to separate the clutch elements 64, 65. In like manner the clutch push rod 150 engages a slidable declutching member 152 which is effective to separate the clutch elements 76, 78. The chain portion 146 preferably has sufficient looseness or slack to permit the chain 121 to swing the yoke 119 nearly to the end of its movement before swinging the actuating finger 148 to disengage the clutches. Thus the controlled parts may be simply actuated in timed sequence by the vertical movement of the power lift mechanism.

In preparing the implement for transport, then, it is merely necessary for the driver of the tractor to operate the power lift mechanism thereon which is effective not only to raise the implement evenly from the ground but to produce a slightly delayed counterclockwise rotation of the declutching finger 148 thereby to effect independent and complete uncoupling of the raking reels. This not only reduces the wear and danger of damage of the reels during transport to a minimum but also reduces the amount of power required from the tractor.

Although the right-hand reel 12 has been described as adjustable to two positions, that is a raking position and a transport position, it is entirely feasible to mount the reel 12 for swinging movement through the same angular range as reel 14. This would permit the user to arrange the reels in parallel relation with both of the reels angled to discharge to the right instead of the left. Stated another way, it is merely necessary to construct the right-hand portion 25 of the implement in the same way as the left-hand portion 26 already described in detail. The delivery of hay optionally to the left or to the right is a feature particularly advantageous in raking irrigated land where the rake may be drawn back and forth across the field instead of around the field in one direction only.

I claim as my invention:

1. For use with a tractor having a power elevated draft link and means shiftable with respect to said draft link as an incident to the elevation thereof, an implement comprising a frame having a hitch at its forward end for connection to the tractor draft link, ground-engaging means to support the rear end of the implement including a rearwardly extending arm pivoted at said rear end for movement in a vertical plane and having a ground wheel rotatably mounted thereon, means including a bell crank for positioning said arm, and means connecting said shiftable means to said bell crank to cause a change in the level of the rear end of the implement upon elevation of the tractor draft link.

2. For use with a tractor having a power elevated draft link trailingly pivoted to the rear end portion thereof, an implement comprising a frame having a hitch at its forward end for connection to the tractor draft link, ground-engaging means at the rear end of the implement frame for supporting the same, means associated with the ground-engaging means for increasing the level of the frame above the ground, an actuating link having one end adapted to be supported on the rear end of the tractor at a point above the draft link and which undergoes only very limited movement upon elevation of the draft link, said actuating link being positioned to extend downwardly and rearwardly into the vicinity of said draft link, and means for coupling the lower end of said actuating link to the level increasing means so that the relative motion between the actuating link and the draft link upon elevating the latter causes the rear end of said frame to increase in level simultaneously with the front portion thereof.

3. For use with a tractor having a power elevated draft link and having means shiftable with respect to said draft link as an incident to the elevation thereof, an implement comprising mechanism requiring rotative power, a frame for mounting said mechanism and having a hitch at its forward end for connection to the tractor draft link, ground-engaging means to support the rear end of the implement including a ground wheel and an adjustable arm connected thereto for adjusting the level of the frame above the ground, means for coupling and uncoupling said ground wheel with respect to the rotatable mechanism, and means actuated by said shiftable means for not only producing elevation of the rear end of the implement but also the uncoupling of said rotatable mechanism upon elevation of the tractor draft link.

4. For use with a tractor having a power elevated draft link trailingly pivoted to the rear end portion thereof, an implement comprising a frame having a hitch member at its forward end for connection to the tractor draft link, ground-engaging means at the rear end of said frame for supporting the same and including a rearwardly extending arm having a ground wheel rotatably mounted at the end thereof, an actuating link having one end adapted to be supported on the rear end of the tractor at a point above the draft link and which undergoes negligible movement upon the elevation of the draft link, said actuating link being positioned to extend downwardly and rearwardly into the vicinity of said draft link, a bell crank on said hitch member arm having an arm engaging the lower end of said actuating link, and a tension transmitting element for interconnecting said bell crank and said rearwardly extending arm so that the relative motion between the actuating link and the draft link upon elevating the latter causes rotation of said arm in a direction to increase the level of the rear end of the frame at the same time that the front portion thereof is raised by said tractor draft link.

5. For use with a tractor having a power elevated draft link and having means shiftable with respect to said draft link as an incident to the elevation thereof, an implement comprising, in combination, power driven mechanism, a frame for mounting said mechanism and having a hitch at its forward end for connection to the tractor draft link, ground engaging means to support the rear end of the implement including means for adjusting the level of the frame above the ground, means associated with said mechanism for uncoupling the same, and means actuated by said shiftable means upon elevation of the tractor draft link for not only producing elevation of the rear end of the implement but also for uncoupling said mechanism.

6. For use with a tractor having a power lift means and having means shiftable as an incident to the operation of said lift means, an implement comprising, in combination, a power driven implement mechanism, a frame for mounting said mechanism and having a hitch at its forward end for connection to the tractor, ground engaging means to support the implement including means for adjusting the level of the frame above the ground, and means actuated by said shiftable means for not only producing elevation of the implement but also the uncoupling of said power driven mechanism upon elevation of the power lift means.

7. For use with a tractor having a power lift means and having means shiftable as an incident to the operation of said lift means, an implement comprising, in combination, a plurality of positionable elements, a frame for mounting said elements and having a hitch at its forward end for connection to the tractor, an elongate tension transmitting member carried by said frame having its forward end adapted for connection to said shiftable means and having its body portion connected to the positionable elements so that the latter may be controllably positioned upon movement of said tension member.

8. An implement controlling hitch for connection to a tractor having a power elevated draft link and an upper link trailingly pivoted to the rear end thereof in generally parallel relation comprising, in combination, means including a generally upright member pivotally connected to the trailing ends of said links respectively, a bell crank pivoted for rocking movement with respect to said upright member, an actuating link, means for mounting the actuating link adjacent the rear end portion of said tractor to extend rearwardly and downwardly into engagement with one arm of said bell crank so that upon elevation of said draft links said crank is caused to undergo rocking movement, an implement draft connection associated with said draft link, and means for connecting said crank to a shiftable control element on said implement.

9. For use with a tractor having a power lift device and having means shiftable as an incident to operation of said lift device, an implement comprising, in combination, a plurality of positionable elements, a frame for mounting said elements and having a hitch at its forward end for connection to the tractor, a force transmitting member carried by said frame having its forward end adapted for connection to said shiftable means, and means for connecting said force transmitting member to individual ones of said positionable elements, said connecting means including a lost motion connection between said member and at least one of said positionable elements so that the latter are positioned in a predetermined timed sequence upon operation of said lift device.

10. An implement controlling hitch for connection to a tractor having power elevated draft links trailingly pivoted to the rear end portion thereof comprising, in combination, means including a generally upright member pivotally connected at its lower portion to the trailing ends of said links and having an upper link pivoted to its upper portion and projecting forwardly toward said tractor, means at the forward end of said upper link for pivotal connection to said tractor, a bell crank pivoted for movement with respect to said upright member, an actuating link to the forward end of said upper link and extending rearwardly and downwardly into engagement with one arm of said bell crank so that upon elevation of said draft links said crank is caused to undergo rocking movement, a draft connection on said upright member for the trailing attachment of an implement, and means for connecting said crank to a shiftable controle element on said implement.

WILLIAM G. SPURLIN.

REFERENCES CITED

The following references are of record in the file of this patent:

UNITED STATES PATENTS

| Number | Name | Date |
|---|---|---|
| 1,272,617 | Burgess | July 16, 1918 |
| 1,291,392 | Burgess | Jan. 14, 1919 |
| 1,687,310 | Randall | Oct. 9, 1928 |
| 2,175,088 | Oppenheim et al. | Oct. 3, 1939 |
| 2,322,342 | Bunn | June 22, 1943 |
| 2,403,401 | Rietz | July 2, 1946 |
| 2,445,260 | Brimhall | July 13, 1948 |

FOREIGN PATENTS

| Number | Country | Date |
|---|---|---|
| 517,070 | Great Britain | Jan. 19, 1940 |